(12) United States Patent
Srinivasan et al.

(10) Patent No.: US 11,303,938 B2
(45) Date of Patent: Apr. 12, 2022

(54) SYSTEMS AND METHODS FOR OPTIMIZING A SET-TOP BOX TO RETRIEVE MISSED CONTENT

(71) Applicant: Rovi Guides, Inc., San Jose, CA (US)

(72) Inventors: Madhusudhan Srinivasan, Bangalore (IN); Piar Chand, Bangalore (IN); Labhala Gowtham, Bangalore (IN); Durga Prasad Pulicharla, Andhra Pradesh (IN); Aditya Rautray, Odisha (IN); Deviprasad Punja, Bangalore (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/182,626

(22) Filed: Feb. 23, 2021

(65) Prior Publication Data

US 2021/0176507 A1 Jun. 10, 2021

Related U.S. Application Data

(63) Continuation of application No. 16/893,034, filed on Jun. 4, 2020, now Pat. No. 10,958,949, which is a continuation of application No. 16/205,990, filed on Nov. 30, 2018, now Pat. No. 10,708,637.

(51) Int. Cl.
*H04N 21/234* (2011.01)
*H04N 21/231* (2011.01)
*H04N 21/218* (2011.01)
*H04N 21/81* (2011.01)

(52) U.S. Cl.
CPC .. *H04N 21/23424* (2013.01); *H04N 21/21825* (2013.01); *H04N 21/23106* (2013.01); *H04N 21/812* (2013.01)

(58) Field of Classification Search
CPC ................................................ H04N 21/23424
See application file for complete search history.

(56) References Cited

U.S. PATENT DOCUMENTS

| | | | |
|---|---|---|---|
| 6,317,761 B1 | 11/2001 | Landsman et al. | |
| 7,761,892 B2 | 7/2010 | Ellis et al. | |
| 2007/0266400 A1 | 11/2007 | Rogers et al. | |
| 2008/0109376 A1* | 5/2008 | Walsh | G06Q 50/188 705/80 |
| 2009/0260028 A1 | 10/2009 | Fraschilla et al. | |
| 2012/0072272 A1 | 3/2012 | Kilar et al. | |
| 2012/0167132 A1 | 6/2012 | Mathews et al. | |

* cited by examiner

*Primary Examiner* — Michael H Hong
(74) *Attorney, Agent, or Firm* — Haley Guiliano LLP (57) ABSTRACT

The systems and methods described herein optimize the retrieval of missed content by playing back cached content to enable tuners with limited capacity to retrieve the missed content. A content presentation system may receive, with a tuner, a transmission of content comprising media content and advertisements. The content presentation system may cache the advertisements. The content presentation system may determine whether an interruption during the transmission resulted in a missed portion of content and, in response, determine whether an advertisement upcoming at a time period in the transmission of content is cached. If the upcoming advertisement is cached, the content presentation system may play back the cached advertisement at the time period and release the tuner previously receiving the transmission of content to retrieve the missed portion of the content during the time period.

20 Claims, 5 Drawing Sheets

SYSTEMS AND METHODS FOR OPTIMIZING A SET-TOP BOX TO RETRIEVE MISSED CONTENT

CROSS-REFERENCE TO RELATED APPLICATIONS

This application is a continuation of U.S. patent application Ser. No. 16/893,034, filed Jun. 4, 2020, which is a continuation of U.S. patent application Ser. No. 16/205,990 (now U.S. Pat. No. 10,708,637), filed Nov. 30, 2018. The disclosures of which are hereby incorporated by reference herein in their entireties.

TECHNICAL FIELD

The present disclosure is directed to using tuners to retrieve missed content and, more particularly, to systems and methods that use a tuner receiving a transmission of content to retrieve a missed portion of the content by playing back a cached version of an advertisement in the transmission.

BACKGROUND

Viewers of broadcast content often experience interruptions in the content due to factors such as signal loss, rain fade, power outages, etc. These interruptions can cause gaps in the content. This problem only increases as content systems continually move to more mobile systems and users increasingly consume content on mobile devices.

SUMMARY

In view of these problems, a system (e.g., a set-top box, mobile device, etc.) is described herein that features a novel technique for retrieving missed content. The system may employ a number of tuners to convert a digital transmission into audio and/or video signals that are processed further to produce sounds and/or pictures. These tuners may be used to receive both live transmission of content and non-live content that was missed earlier due to an interruption; however, the receiving capacity of the tuners is limited. If a user is engaging (e.g., to view a live transmission of content) all available tuners, there is not any additional tuner capacity to also receive other content (e.g., content that was missed earlier due to an interruption).

Solutions over conventional systems for controlling tuners during live transmission of content are described herein. The systems and methods described herein achieve benefits over conventional systems by optimizing the retrieval of missed content in the context of limited tuner capacity. Specifically, the systems and methods relate to selectively caching particular content in order to selectively release tuners when the particular content is transmitted in the future such that the released tuners may receive other content while the particular content is played back from the cache. In an illustrated example, a content presentation system (e.g., a set-top box) receives, with a tuner, a transmission of content that includes both media content and advertisements. The system caches the advertisements, each of which is associated with a unique identifier. The system then determines whether an interruption during the transmission resulted in part of the content being missed. If the system determines some content has been missed, the system detects an upcoming advertisement in the transmission of content and determines whether the upcoming advertisement is cached (e.g., by checking local storage for an advertisement with a matching unique identifier as the upcoming advertisement). If the upcoming advertisement is cached, the system plays back the cached version of the upcoming advertisement, thereby releasing a tuner that would have been used to receive the advertisement in the transmission. This tuner may then be used by the system to retrieve or receive the content that was missed earlier in the transmission. Thus, the system enables a more optimal usage of transmission-receiving tuners by caching content that may be repeated in the transmission so the repeated content does not require redundant usage of the tuners.

Notably, this system may be used for any content that is repeatedly transmitted and/or displayed. For example, while advertisements are one example of the same content being repeatedly transmitted and/or displayed, the system and methods disclosed herein may also achieve the desired effects with other repeatedly transmitted and/or displayed content such as program intros, show credits, sports replays, previous program summaries, and/or any content in a program that is repeatedly transmitted and/or displayed. Likewise, although the term "tuner" is used throughout this disclosure it should be noted that the embodiments disclosed herein may additionally or alternatively feature a tunerless system, in which the capacity of a system resource and/or other constraint restricts the transmission of a suitable amount of separate content streams. For example, the systems and methods herein could be used to compensate for a limited amount of user accounts for a particular content provider, which prevents a user from receiving multiple streams simultaneously. In such a scenario, the "tuner" may be replaced with a "user account" and/or the other constraining resource in the embodiments below.

Several techniques are described herein for using tuners to retrieve missed content by caching advertisements. The content presentation system may cache an advertisement by storing, in local storage, a copy of the advertisement and an associated unique identifier. In some embodiments, the system may perform the caching of the advertisement during playback of the advertisement. In some embodiments, the content presentation system may use a storage-tracking data structure to track advertisements that have been cached. For example, after locally storing the copy of the advertisement and its associated unique identifier, the content presentation system may update, in the storage-tracking data structure, a field that corresponds to the associated unique identifier. For example, the field may be a Boolean value that is initialized as "False" and is set to "True" if the advertisement associated with the unique identifier is cached. The system may then check whether an upcoming advertisement has been cached by performing a lookup function on the data structure using the unique identifier of the upcoming advertisement. For example, if the data structure returns a Boolean value of "True" to a lookup of the unique identifier of an upcoming advertisement, the system may determine that the upcoming advertisement has been cached and may therefore be retrieved from local storage. In some embodiments, the content presentation system may determine that an advertisement is upcoming in the transmission at a particular time or during a particular time period by detecting a signal in the transmission, where the signal includes an associated unique identifier of the advertisement upcoming in the transmission.

In some embodiments, the content presentation system may receive an advertisement schedule that identifies respective time periods for each advertisement in the transmission of content. For example, the advertisement schedule may be provided by a content provider. In some embodiments, the system may use the advertisement schedule to cache an advertisement before it has been played back in the transmission of content. For example, the system may select an advertisement (and an associated unique identifier) listed in the advertisement schedule and, prior to playback of the selected advertisement, retrieve the advertisement from a content server and store it locally. In other embodiments, the system may cache the advertisements as they are being played back in the transmission of content, as discussed above. The advertisement schedule may also be used by the system to determine when an advertisement is upcoming in the transmission of content. For example, the system may determine that an upcoming time period in the transmission of content matches a respective time period of a respective advertisement in the advertisement schedule, and therefore that the transmission of content will play back the respective advertisement in the upcoming time period. The system may then check whether the respective advertisement has been cached, e.g., by checking a storage-tracking data structure, as discussed above. If the advertisement is cached, the system will, at the upcoming time period, play back the cached version of the advertisement, thereby freeing up tuner capacity to retrieve content that may have been missed earlier.

Thus, the systems and methods described herein solve the problem of tuners with limited capacity not being able to simultaneously receive live transmission of content and retrieve missed content that was not successfully transmitted initially due to an interruption. The techniques described herein play back cached versions of advertisements to decrease tuner load during live transmission of content and increase the capacity of the tuners to retrieve content that was missed during the transmission.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
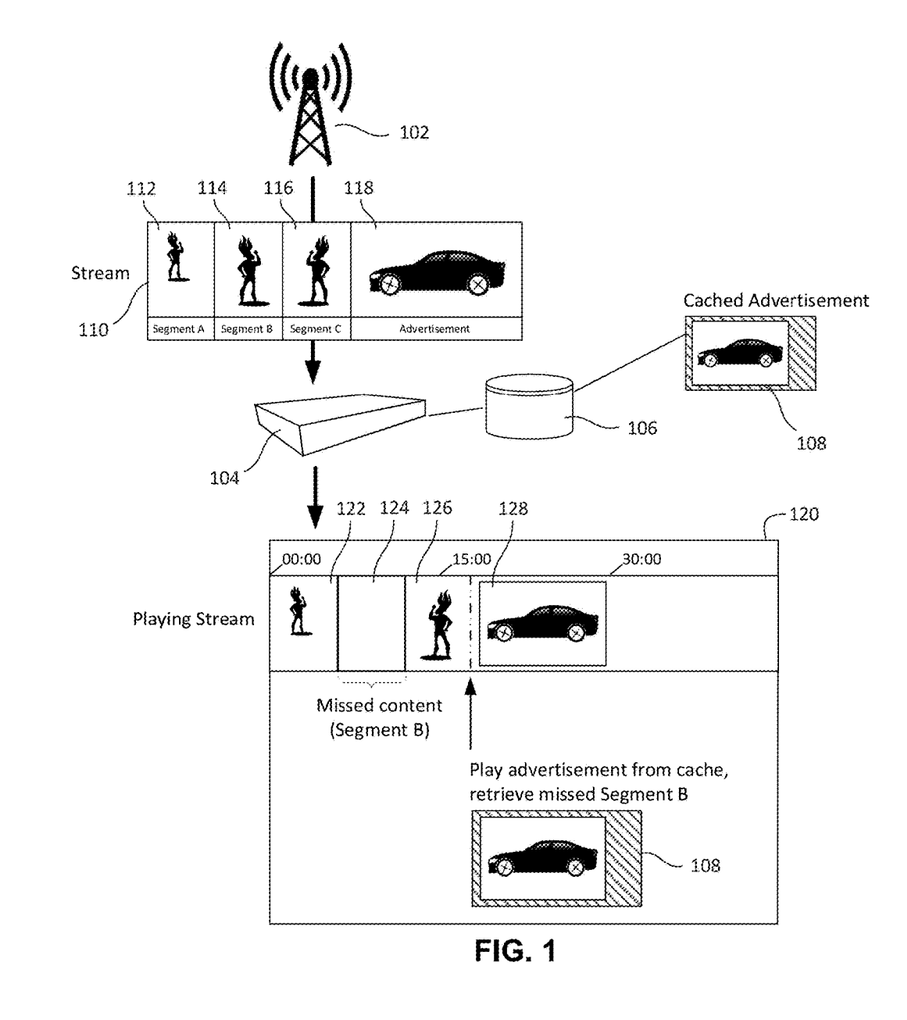
FIG. 1 shows an illustrative diagram of the content presentation system's operation during live transmission of content, in accordance with some embodiments of the disclosure.

FIG. 1 shows an illustrative diagram of the content presentation system's operation during live transmission of content, in accordance with some embodiments of the disclosure. In FIG. 1, transmission source 102 transmits stream 110 to content presentation system 104. For example, transmission source 102 may be an antenna of a broadcast content provider. Stream 110 includes multiple segments: content segments A (112), B (114), and C (116), and an advertisement segment (118). Content segments may be delineated by a content provider, for example, based on scenes, plotline, time frames (e.g., the content segments may be continuous, adjacent 5-minute intervals), presence of particular characters or actors, or any other suitable means of segmenting media content. In some scenarios, stream 110 may include fewer segments than shown; in other scenarios, stream 110 may include additional segments (of content and/or advertising). An advertisement segment may be adjacent to another advertisement segment within the stream, or advertisement segments may be separated from other advertisement segments by one or more content segments. Further, each of segments 112, 114, 116, and 118 may have associated metadata. For example, advertising segment 118 may be associated with a unique identifier, as discussed above. The unique identifier may be an alphanumeric string, a hexadecimal value, or any other suitable value.

Content presentation system 104 receives transmitted stream 110 from transmission source 102. Content presentation system 104 is depicted in FIG. 1 as a set-top box, but may be any other suitable device for receiving and presenting transmitted content, such as the user devices of FIGS. 2-3 described below. Content presentation system 104 may have tuners configured to receive digital transmission signals or other resource constraints that affect reception of digital transmission signals. Content presentation system 104 may include storage 106 either internally or externally. For example, content presentation system 104 may be a set-top box with built-in local storage. In another example, content presentation system 104 may be a set-top box with a physically separate storage unit that is connected to the set-top box with a cable. Cached advertisement 108, corresponding to advertisement segment 118 from stream 110, may be stored in storage 106. In some embodiments, multiple cached advertisements corresponding to multiple advertisement segments in stream 110 are stored in storage 106.

Window 120 of FIG. 1 shows a playback sequence of stream 110 by content presentation system 104. Segments 122, 124, 126, and 128 in the playback sequence correspond, respectively, to segments 112, 114, 116, and 118 of transmitted stream 110. As shown, segment 124 may have been "missed"—i.e., not properly received—by content presentation system 104. For example, a power outage affecting content presentation system 104 may have interrupted the system's reception of stream 110. In some embodiments, the interruption of the transmission of content may occur at transmission source 102. For example, signal loss or rain fade at transmission source 102 may have degraded, in quality, a portion of stream 110 during transmission, resulting in content presentation system 104 not receiving that portion of the stream, in full or in part. The missed portion of the stream may include multiple and/or partial segments. In some embodiments, even if only part of a segment was missed, the entire content segment will be flagged by the system for retrieval. It should be understood that a "part" of a segment may be determined by playback time (e.g., the part of the segment from playback position 1 minute and 5 seconds to playback position 1 minute and 30 seconds); media type (e.g., an audio part of content vs. a visual/display part); or any other appropriate separation of multimedia content. Content presentation system 104 may retrieve missed segment 124 while continuing to present the following segments in the stream, for example to allow a viewer to watch the missed content at a later time. In another scenario, the user may have programmed content presentation system 104 to record the live transmission for viewing at a later time. Thus, even if a segment of the content is missed during live transmission, the viewer may be able to view the full content (including the missed segment) if the segment is retrieved before the user views the recording.

During the playback sequence in window 120, content presentation system 104 may detect upcoming advertisement segment 128 at, e.g., a time period of 17 minutes into playback. As discussed in further detail below regarding FIG. 5, content presentation system 104 may determine there is an upcoming advertisement segment by using an advertisement schedule. In some embodiments, content presentation system 104 may determine there is an upcoming advertisement segment by detecting a signal in the transmission, where the signal may indicate, for example, the unique identifier associated with the upcoming advertisement. Upon detecting upcoming advertisement segment 128, content presentation system 104 checks whether there is a corresponding advertisement cached in storage 106. After determining that corresponding cached advertisement 108 is cached in storage 106, content presentation system 104 may retrieve the cached advertisement and play it back, thereby releasing one or more tuners to retrieve missed content segment 124.

Figure 2:
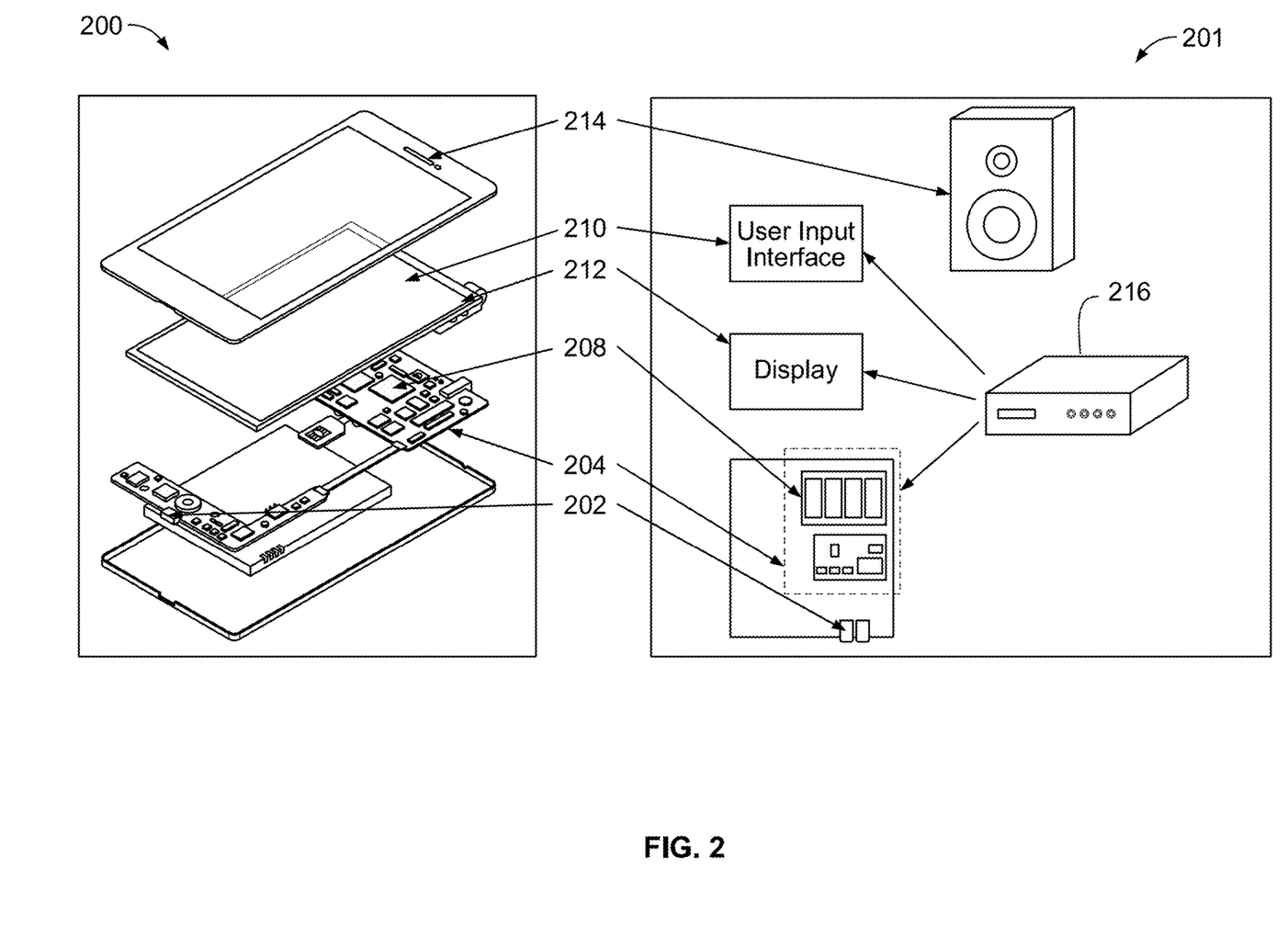
FIG. 2 is a diagram of illustrative user equipment, in accordance with some embodiments of the disclosure.

Users may access content and the applications from one or more of their media devices, i.e., user equipment. FIG. 2 shows generalized embodiments of an illustrative device, i.e., a device in content presentation system 104. For example, content presentation system 104 may include a smartphone device, a tablet, or a remote control, such as illustrative user equipment 200. In another example, content presentation system 104 may be a user equipment system 201. User equipment system 201 may include a set-top box 216. Set-top box 216 may be communicatively connected to speaker 214 and display 212. In some embodiments, display 212 may be a television display or a computer display. In some embodiments, set-top box 216 may be communicatively connected to user interface input 210. In some embodiments, user interface input 210 may be a remote control device. Set-top box 216 may include one or more circuit boards. In some embodiments, the circuit boards may include control circuitry and storage (e.g., RAM, ROM, Hard Disk, Removable Disk, etc.). In some embodiments, circuit boards may include an input/output path. More specific implementations of user equipment devices are discussed below in connection with FIG. 3. Each one of user equipment devices 200 and user equipment system 201 may receive content and data via input/output (hereinafter "I/O") path 202. I/O path 202 may provide content (e.g., broadcast programming, on-demand programming, Internet content, content available over a local area network (LAN) or wide area network (WAN), and/or other content) and data to control circuitry 204 and storage 208. Control circuitry 204 may be used to send and receive commands, requests, and other suitable data using I/O path 202. I/O path 202 may connect control circuitry 204 to one or more communications paths (described below). I/O functions may be provided by one or more of these communications paths but are shown as a single path in FIG. 2 to avoid overcomplicating the drawing.

Control circuitry 204 should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate units, for example, multiple of the same type of processing units (e.g., two Intel Core i7 processors) or multiple different processors (e.g., an Intel Core i5 processor and an Intel Core i7 processor). In some embodiments, control circuitry 204 executes instructions for an application stored in memory (e.g., storage 208). Specifically, control circuitry 204 may be instructed by the application to perform the functions discussed above and below. For example, the application may provide instructions to control circuitry 204 to generate the media guidance displays. In some implementations, any action performed by control circuitry 204 may be based on instructions received from the application.

Figure 3:
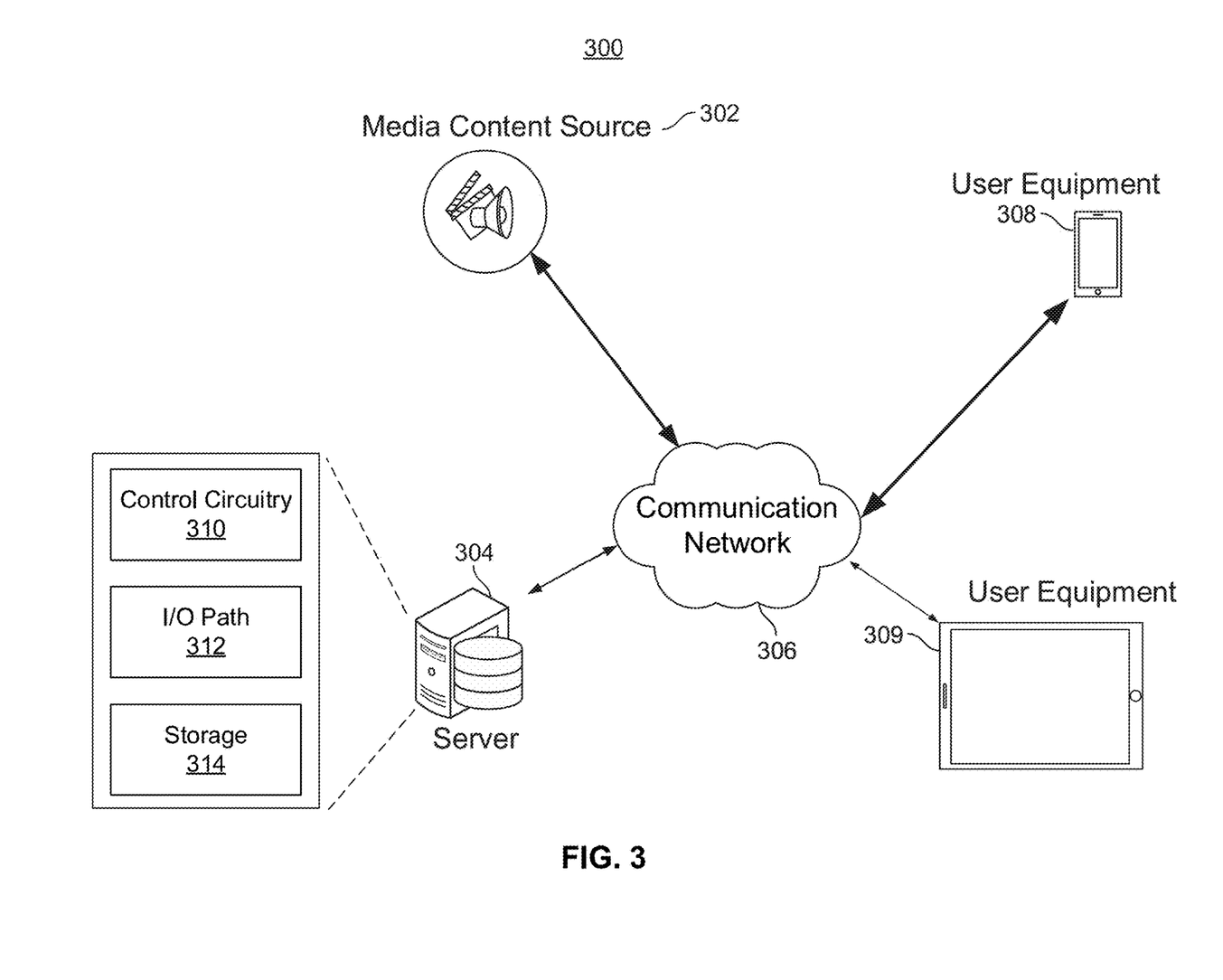
FIG. 3 is a diagram of an illustrative media system, in accordance with some embodiments of the disclosure.

In client server-based embodiments, control circuitry 204 may include communications circuitry suitable for communicating with a content recommendation application server (e.g., server 304) or other networks or servers. The instructions for carrying out the above-mentioned functionality may be stored on the content recommendation application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other (described in more detail below).

Memory may be an electronic storage device provided as storage 208 that is part of control circuitry 204. As referred to herein, the phrase "electronic storage device" or "storage device" should be understood to mean any device for storing electronic data, computer software, or firmware, such as random-access memory, read-only memory, hard drives, non-transitory computer readable medium, or any other suitable fixed or removable storage devices, and/or any combination of the same. Storage 208 may be used to store various types of content, media guidance data, and instructions for executing content access applications. Nonvolatile memory may also be used (e.g., to launch a boot-up routine and other instructions).

Control circuitry 204 may include video-generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 204 may also include scaler circuitry for upconverting and downconverting content into the preferred output format of the user equipment 200. Circuitry 204 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video-generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch-and-record functions, picture-in-picture (PIP) functions, multiple-tuner recording, etc.). If storage 208 is provided as a separate device from user equipment 200, the tuning and encoding circuitry (including multiple tuners) may be associated with storage 208.

A user may send instructions to control circuitry 204 using user input interface 210. User input interface 210 may be any suitable user interface, such as a remote control, mouse, trackball, keypad, keyboard, touchscreen, touchpad, stylus input, joystick, voice recognition interface, or other user input interfaces. Display 212 may be provided as a stand-alone device or integrated with other elements of each one of user equipment device 200 and user equipment system 201. For example, display 212 may be a touchscreen or touch-sensitive display. In such circumstances, user input interface 210 may be integrated with or combined with display 212. A video card or graphics card may generate the output to the display 212. The video card may offer various functions such as accelerated rendering of 3D scenes and 2D graphics, MPEG-2/MPEG-4 decoding, TV output, or the ability to connect multiple monitors. The video card may be integrated with the control circuitry 204. Speakers 214 may be provided as integrated with other elements of each one of user equipment device 200 and user equipment system 201 or may be stand-alone units. The audio component of videos and other content displayed on display 212 may be played through speakers 214. In some embodiments, the audio may be distributed to a receiver (not shown), which processes and outputs the audio via speakers 214.

The content presentation system may be implemented using any suitable architecture. For example, the content presentation system may be a stand-alone application wholly implemented on each one of user equipment device 200 and user equipment system 201. In such an approach, instructions for the application are stored locally (e.g., in storage 208), and data for use by the application is downloaded on a periodic basis (e.g., from an out-of-band feed, from an Internet resource, or using another suitable approach). Control circuitry 204 may retrieve instructions of the application from storage 208 and process the instructions to generate any of the displays discussed herein. Based on the processed instructions, control circuitry 204 may determine what action to perform when input is received from input interface 210. For example, movement of a cursor on a display up/down may be indicated by the processed instructions when input interface 210 indicates that an up/down button was selected.

In some embodiments, the applications are client-server based applications. Data for use by a thick or thin client implemented on each one of user equipment device 200 and user equipment system 201 is retrieved on-demand by issuing requests to a server remote to each one of user equipment device 200 and user equipment system 201. In one example of a client-server based content presentation system, control circuitry 204 runs a web browser that interprets web pages provided by a remote server (e.g., server 304). For example, the remote server may store the instructions for the application in a storage device (e.g., 314 or storage 106 in FIG. 1). The remote server may process the stored instructions using circuitry (e.g., control circuitry 310) and generate the displays discussed above and below. The client device may receive the displays generated by the remote server and may display the content of the displays locally on equipment device 200. This way, the processing of the instructions is performed remotely by the server while the resulting displays are provided locally on equipment device 200. Equipment device 200 may receive inputs from the user via input interface 210 and transmit those inputs to the remote server for processing and generating the corresponding displays. For example, equipment device 200 may transmit a communication to the remote server indicating that an up/down button was selected via input interface 210. The remote server may process instructions in accordance with that input and generate a display of the application corresponding to the input (e.g., a display that moves a cursor up/down). The generated display is then transmitted to equipment device 200 for presentation to the user.

In some embodiments, the applications are downloaded and interpreted or otherwise run by an interpreter or virtual machine (run by control circuitry 204). In some embodiments, the applications may be encoded in the ETV Binary Interchange Format (EBIF), received by control circuitry 204 as part of a suitable feed, and interpreted by a user agent running on control circuitry 204. For example, the applications may be an EBIF application. In some embodiments, the content delivery application may be defined by a series of JAVA-based files that are received and run by a local virtual machine or other suitable middleware executed by control circuitry 204. In some of such embodiments (e.g., those employing MPEG-2 or other digital media encoding schemes), the applications may be, for example, encoded and transmitted in an MPEG-2 object carousel with the MPEG audio and video packets of a program.

FIG. 3 is a diagram of an illustrative media system, in accordance with some embodiments of the disclosure. User equipment devices 308 and 309 (which may be, for example, part of content presentation system 104) may be coupled to communication network 306. Communication network 306 may be one or more networks including the Internet, a mobile phone network, mobile voice or data network (e.g., a 4G or LTE network), cable network, public switched telephone network, or other types of communications network or combinations of communications networks. Paths (e.g., depicted as arrows connecting the respective devices to communication network 306) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 3 to avoid overcomplicating the drawing.

Although communications paths are not drawn between user equipment devices, these devices may communicate directly with each other via communication paths as well as other short-range, point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communication network 306.

System 300 includes media content source 302 (i.e., transmission source 102 in FIG. 1) and server 304. Communications with the media content source 302 and server 304 may be exchanged over one or more communications paths, but are shown as a single path in FIG. 3 to avoid overcomplicating the drawing. In addition, there may be more than one of each of media content source 302 and server 304, but only one of each is shown in FIG. 3 to avoid overcomplicating the drawing. If desired, media content source 302 and server 304 may be integrated as one source device (e.g., transmission source 102).

In some embodiments, the server 304 may include control circuitry 310 and storage 314 (e.g., RAM, ROM, Hard Disk, Removable Disk, etc.). The server 304 may also include an input/output path 312. I/O path 312 may provide device information, or other data, over a local area network (LAN) or wide area network (WAN), and/or other content and data to control circuitry 310, which includes processing circuitry, and storage 314 (i.e., storage 106 in FIG. 1). Control circuitry 310 may be used to send and receive commands, requests, and other suitable data using I/O path 312. I/O path 312 may connect control circuitry 204 (and specifically processing circuitry) to one or more communications paths.

Control circuitry 310 may be based on any suitable processing circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 310 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 310 executes instructions for an emulation system application stored in memory (e.g., storage 314).

Memory may be an electronic storage device provided as storage 314 that is part of control circuitry 310. As referred to herein, the phrase "electronic storage device" or "storage device" should be understood to mean any device for storing electronic data, computer software, or firmware, such as random-access memory, read-only memory, hard drives, solid state devices, quantum storage devices, or any other suitable fixed or removable storage devices, and/or any combination of the same. Nonvolatile memory may also be used (e.g., to launch a boot-up routine and other instructions).

Server 304 may retrieve guidance data from media content source 302, process the data as will be described in detail below, and forward the data to the client devices 308 and 309. Media content source 302 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Media content source 302 may be the originator of content (e.g., a television broadcaster, a Webcast provider, etc.) or may not be the originator of content (e.g., an on-demand content provider, an Internet provider of content of broadcast programs for downloading, etc.). Media content source 302 may include cable sources, satellite providers, on-demand providers, Internet providers, over-the-top content providers, or other providers of content. Media content source 302 may also include a remote media server used to store different types of content (including video content selected by a user), in a location remote from any of the client devices. Systems and methods for remote storage of content and providing remotely stored content to user equipment are discussed in greater detail in connection with Ellis et al., U.S. Pat. No. 7,761,892, issued Jul. 20, 2010, which is hereby incorporated by reference herein in its entirety.

Media content source 302 may also provide media guidance data that can be used to create carousels and queries as described herein. Media guidance data may be provided to the client devices using any suitable approach. Program schedule data and other guidance data may be provided to the client devices on a television channel sideband, using an in-band digital signal, using an out-of-band digital signal, or by any other suitable data transmission technique.

Client devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices (such as, e.g., server 304), which may be located centrally or at distributed locations, that provide cloud-based services to various types of users and devices connected via a network such as the Internet via communication network 306. In such embodiments, user equipment devices may operate in a peer-to-peer manner without communicating with a central server.

Figure 4:
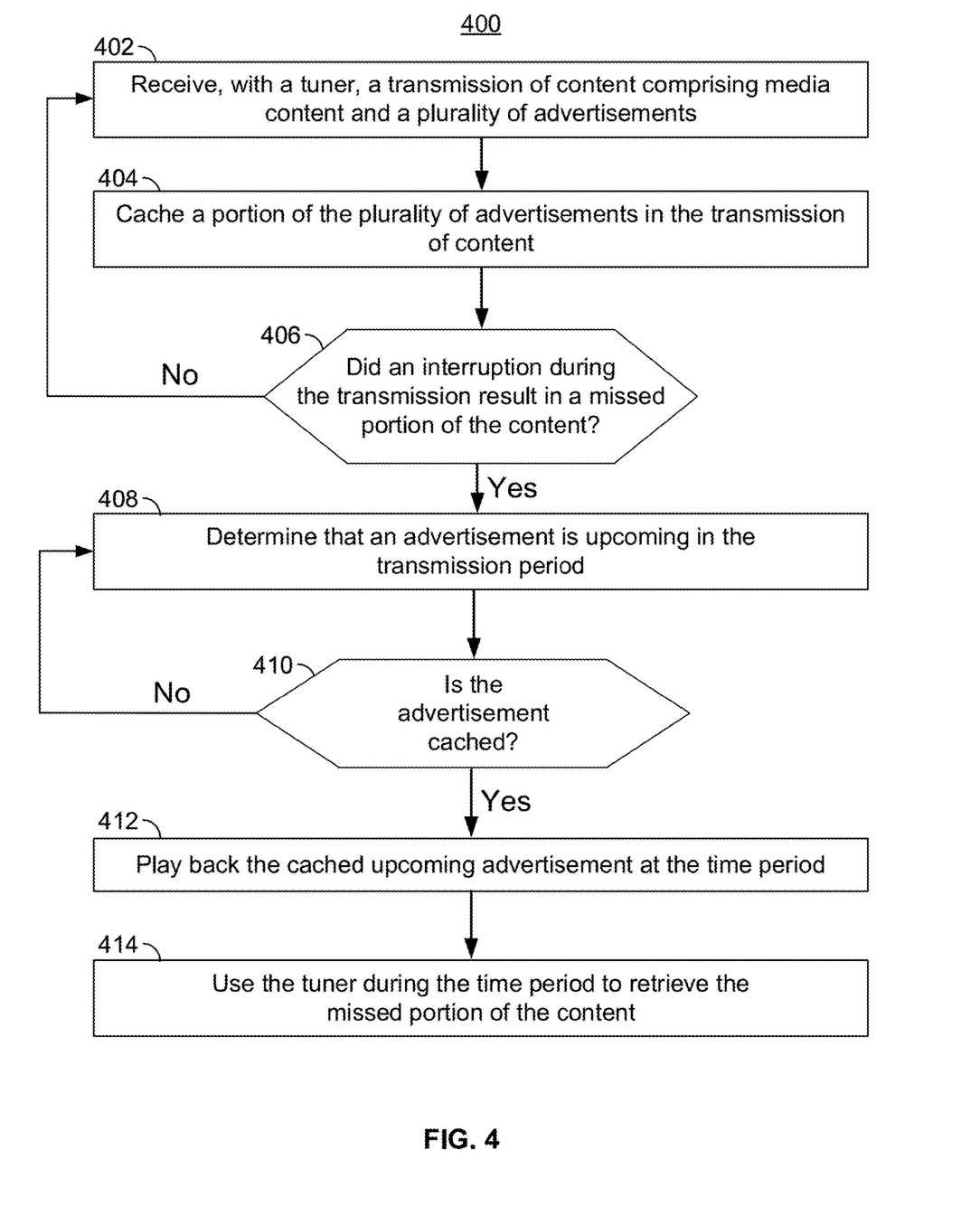
FIG. 4 is a flowchart of a detailed illustrative process for using tuners to retrieve missed content during a live transmission, in accordance with some embodiments of the disclosure.
Figure 5:
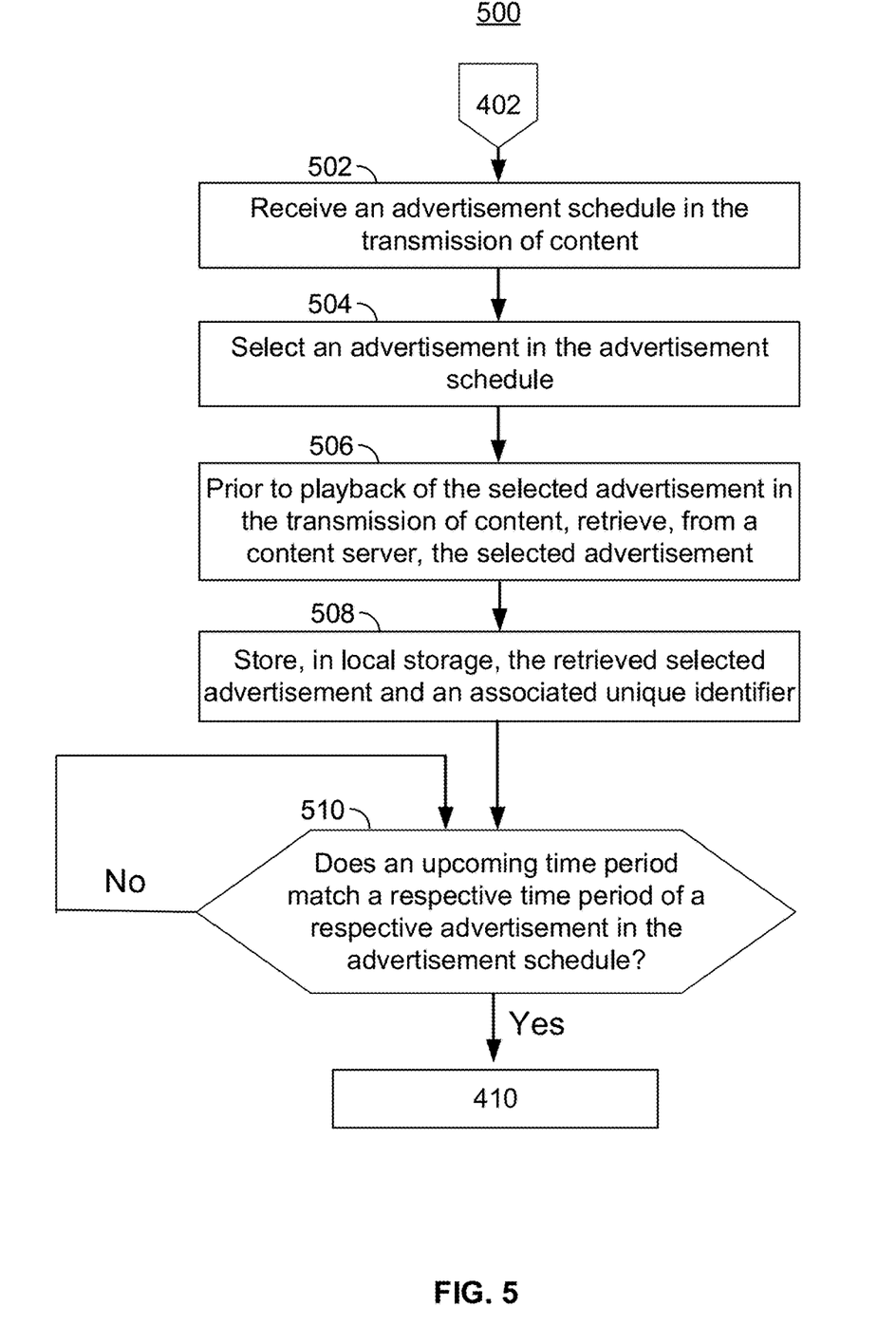
FIG. 5 is a flowchart of a detailed illustrative process for caching advertisements in a live transmission of content, in accordance with some embodiments of the disclosure.

The systems and devices described in FIGS. 2 and 3 enable not only the illustrative embodiment of FIG. 1, but also the execution of processes described in FIGS. 4-5. It should be noted that each step of processes described in FIGS. 4-5 is performed by the previously-described control circuitry (e.g., in a manner instructed to control circuitry 204 or 310 by a content presentation system). It should be noted that the embodiments of FIGS. 4-5 can be combined with any other embodiment in this description and are not limited to the devices or control components used to illustrate the processes.

FIG. 4 is a flowchart of a detailed illustrative process for using tuners to retrieve missed content during a live transmission, in accordance with some embodiments of the disclosure. A main loop of process 400 begins at step 402. At step 402, a content presentation system receives, with a tuner, e.g., using control circuitry 310, a transmission of content comprising media content and a plurality of advertisements. As discussed above, the content may include one or more content segments, and each segment may have associated metadata. For example, each advertisement in the content may be associated with a unique identifier.

At step 404, the content presentation system caches (e.g., using control circuitry 310) a portion of the plurality of advertisements in the transmission of content. For example, the content presentation system may cache an advertisement by storing (e.g., in storage 106 or 314) a copy of the advertisement and an associated unique identifier. In some embodiments, the content presentation system may perform the caching of the advertisement during playback of the advertisement. That is, upon receiving the advertisement in a live transmission stream, the content presentation system may both present the advertisement in its playback of the live transmission stream and store a copy of the advertisement. In some embodiments, the content presentation system may employ a data structure to keep track of cached advertisements. For example, as discussed above, the content presentation system may use a storage-tracking data structure with Boolean values associated with unique identifiers of advertisements, where performing a lookup on the storage-tracking data structure for an advertisement by its unique identifier may return "True" or "False" based on whether the advertisement is cached. In another example, the content presentation system may use a hash table (or hash map) data structure to keep track of the cached advertisements. For example, a unique identifier of an advertisement may not be mapped (i.e., may return a null value for a lookup) if the advertisement has not been cached; further, a unique identifier of an advertisement may be mapped to a memory address (e.g., a hexadecimal value) if the advertisement is cached, where the memory address indicates where the advertisement is stored and may be retrieved.

At step 406, the content presentation system determines (e.g., using control circuitry 310) whether an interruption during the transmission resulted in a missed portion of the content. For example, the content presentation system may analyze metadata of the successfully received content segments, where the metadata may provide indexing or sequencing information for each content segment. For example, if two received content segments have index field values 0x400 and 0x408, the index fields of adjacent content segments differ by 4, and a content segment with index field value 0x404 was not received, the content presentation system may determine that the content segment was missed and must therefore be retrieved. In some embodiments, if an interruption occurs at the transmission source (i.e., transmission source 102 of FIG. 1), the transmission source may transmit a signal that indicates missed content and enables the content presentation system to determine that a portion of the content has been missed.

Process 400 continues to step 408 if the content presentation system determines that an interruption during the transmission resulted in a missed portion of the content. If the content presentation system does not determine that an interruption during the transmission resulted in a missed portion of the content, process 400 continues at step 402. For example, the content presentation system may continue to receive one or more transmissions of content and periodically check whether a portion of the content was missed due to an interruption.

At step 408, the content presentation system determines (e.g., using control circuitry 310) that an advertisement is upcoming in the transmission at a time period. For example, the content presentation system may detect a signal in the transmission of content indicating an associated unique identifier and playback time of an upcoming advertisement. In some embodiments, the content presentation system may play back the transmitted content a particular amount of time after receiving it. For example, the content presentation system may receive a live content transmission, process the transmission to prepare it for playback presentation over the next, e.g., 1500 milliseconds, and then play back the content, resulting in a delay between reception and playback of the content by the content presentation system. The processing of a content segment in the transmission may include determining (e.g., from metadata) whether the segment includes advertising content and, if so, determining that there this an upcoming advertisement.

At step 410, the content presentation system determines (e.g., using control circuitry 310) whether the upcoming advertisement is cached. As discussed above, the content presentation system may use a data structure (i.e., in storage 106/314) to track cached advertisements. Process 400 continues to step 412 if the content presentation system determines the upcoming advertisement is cached. Further, the content presentation system may, upon determining the upcoming advertisement is cached, retrieve the upcoming advertisement from storage. If the content presentation system does not determine the upcoming advertisement is cached, process 400 continues at step 408. In some embodiments, if the content presentation system does not determine the upcoming advertisement is cached, the content presentation system may cache the upcoming advertisement for later usage.

At step 412, the content presentation system plays back (e.g., using control circuitry 310) the cached upcoming advertisement at the time period. In some embodiments, the content presentation system plays back the cached advertisement by generating it for presentation to a viewer. In some embodiments, as discussed above, the transmission of content is being recorded, rather than consumed live by a viewer, and the content presentation system may "play back" the cached advertisement in the transmission being recorded by inserting the cached advertisement into the recording.

At step 414, the content presentation system uses the tuner (e.g., using control circuitry 310) during the time period to retrieve the missed portion of the content. For example, a tuner fully engaged in receiving the content transmission may, once released, use its newly available bandwidth to send a signal to the transmission source indicating missed content, or receive missed content being transmitted to the system. As discussed above, a "tuner" may be any system resource and/or other constraint that restricts the transmission of a suitable amount of streaming content.

FIG. 5 is a flowchart of a detailed illustrative process for caching advertisements in a live transmission of content, in accordance with some embodiments of the disclosure. Process 500 may, in some embodiments, begin after step 402 of FIG. 4. At step 502, a content presentation system receives (e.g., using control circuitry 310) an advertisement schedule in the transmission of content. The advertisement schedule may indicate respective time periods associated with respective advertisements in the transmission. For example, the advertisement schedule may provide a playback start timepoint and a playback end timepoint for each advertisement in the transmission. The advertisement schedule may have additional information, such as the associated unique identifier for each advertisement, a duration of each advertisement, etc. The advertisement schedule may be provided by a content provider (e.g., via transmission source 102).

At step 504, the content presentation system selects (e.g., using control circuitry 310) an advertisement in the advertisement schedule. For example, the content presentation system may iterate through each of the advertisements listed in the schedule and select each advertisement once during the iteration. Each advertisement may be listed in the schedule by its associated unique identifier, and selecting the advertisement may involve saving the associated unique identifier into a temporary variable. At step 506, prior to playback of the selected advertisement in the transmission of content, the content presentation system retrieves (e.g., using control circuitry 310) the selected advertisement, e.g., from a content server such as server 304 in FIG. 3. For example, the content presentation system may send a request to the content server including the unique identifier associated with the selected advertisement (e.g., saved in the temporary variable), and the content server may, in response, provide the selected advertisement.

At step 508, the content presentation system stores (e.g., using control circuitry 310) in local storage (e.g., storage 106) the retrieved selected advertisement and an associated unique identifier. As described above, in addition to storing the advertisement, the content presentation system may update a data structure that tracks which advertisements have been cached. In some embodiments, the content presentation system may repeat steps 504, 506, and 508 until each of the advertisements in the advertisement schedule has been selected, retrieved, and stored. In some embodiments, some of the advertisements in the advertisement schedule may be duplicates of each other. Thus, the content presentation system may check whether the selected advertisement has already been cached (e.g., as described above in FIG. 4) before performing steps 506 and 508.

At step 510, the content presentation system determines (e.g., using control circuitry 310) whether an upcoming time period matches a respective time period of a respective advertisement in the advertisement schedule. For example, the content presentation system may determine the upcoming time period to be, for example, the next 2 minutes of playback in the transmission of content—e.g., ranging from playback timepoint 4m:30s to 6m:30s. The content presentation system may compare this upcoming time period with each respective advertisement time period listed in the advertisement schedule to determine whether there is a match. For example, the content presentation system may determine that the upcoming time period matches a respective advertisement time period if the time periods overlap. In some embodiments, the respective advertisement time period may comprise one playback timepoint (e.g., a start timepoint), and the content presentation system may determine a match if the one playback time point falls within the upcoming time period of, e.g., 4m:30s to 6m:30s.

Process 500 continues to step 410 of FIG. 4 if the content presentation system determines that the upcoming time period matches a respective time period of a respective advertisement in the advertisement schedule. If the content presentation system does not determine a match, process 500 continues at step 510. For example, the content presentation system may repeat step 510 until it determines a match.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method comprising:
    receiving, at a user device, a first media content item;
    receiving, at the user device, a second media content item;
    determining that a portion of the first media content item is a portion of the second media content item;
    in response to determining that the portion of the first media content item is the portion of the second media content item, storing the portion of the first media content item;
    determining that the portion of the first media content item is a portion of a third media content item that will be received at the user device at an upcoming time;
    detecting an interruption while receiving the third media content item at the device that causes the portion of the third media content item not to be received;
    in response to detecting the interruption that causes the portion of the third media content item not to be received, retrieving from storage the portion of first media content item; and
    causing to be displayed the portion of the first media content item at the time when the portion of the third media content item is to be displayed.

2. The method of claim 1, wherein storing the portion of the first media content item occurs prior to playback of the portion.

3. The method of claim 1, wherein determining that the portion of the first media content item is the portion of the third media content item at an upcoming time comprises detecting a unique identifier of the portion of the first media content item in the portion of the third media content item.

4. The method of claim 1, further comprising:
    in response to determining that the portion of the first media content item is the portion of the second media content item, storing the portion of the first media content item and a unique identifier corresponding to the portion of the first media content item; and
    updating a field corresponding to the unique identifier in a storage-tracking data structure.

5. The method of claim 1, wherein determining that the portion of the first media content item is the portion of the third media content item that will be received at the user device at the upcoming time comprises detecting a unique identifier corresponding to the portion of the first media content item in the third media content item.

6. The method of claim 1, wherein determining that the portion of the first media content item is the portion of the third media content item that will be received at the user device at the upcoming time comprises:
    receiving a first schedule comprising respective time periods for each of a first plurality of portions of the first media content item;
    identifying the time period of the respective time periods for each of the first plurality of portion of the first media content item corresponding to the portion of the first media content item;
    receiving a second schedule comprising respective time periods for each of a second plurality of portions of the third media content item; and
    determining the time period corresponding to the portion of the first media content item is in the second plurality of portions of the third media content item.

7. The method of claim 1, wherein storing the portion of the first media content item comprises storing, in local storage, a copy of the portion of the first media content item and a corresponding unique identifier.

8. The method of claim of claim 7, further comprising:
    in response to storing the copy of the portion of the first media content item and the corresponding unique identifier, updating a field in a storage-tracking data structure corresponding to the corresponding unique identifier.

9. The method of claim 8, further comprising:
    determining whether the portion of the first media content item is stored based on the field corresponding to the corresponding to the unique identifier in the storage-tracking data structure.

10. The method of claim 9, wherein determining the portion of the first media content item is stored comprises determining whether the corresponding unique identifier corresponds to a copy of the portion of the first media content item stored in the local storage.

11. A system comprising:
a memory storing instructions; and
control circuitry communicably coupled to the memory and the communication port and configured to execute the instructions to:
receive, at a user device, a first media content item;
receive, at the user device, a second media content item;
determine that a portion of the first media content item is a portion of the second media content item;
in response to determining that the portion of the first media content item is the portion of the second media content item, store the portion of the first media content item;
determine that the portion of the first media content item is a portion of a third media content item that will be received at the user device at an upcoming time;
detect an interruption while receiving the third media content item at the device that causes the portion of the third media content item not to be received;
in response to detecting the interruption that causes the portion of the third media content item not to be received, retrieve from storage the portion of first media content item; and
cause to be displayed the portion of the first media content item at the time when the portion of the third media content item is to be displayed.

12. The system of claim 11, wherein the control circuitry is further configured to store the portion of the first media content item occurs prior to playback of the portion.

13. The system of claim 11, wherein the control circuitry determines that the portion of the first media content item is the portion of the third media content item at an upcoming time by detecting a unique identifier of the portion of the first media content item in the portion of the third media content item.

14. The system of claim 11, wherein the control circuitry is further configured to:
in response to determining that the portion of the first media content item is the portion of the second media content item, store the portion of the first media content item and a unique identifier corresponding to the portion of the first media content item; and
update a field corresponding to the unique identifier in a storage-tracking data structure.

15. The system of claim 11, wherein the control circuitry is further configured to determine that the portion of the first media content item is the portion of the third media content item that will be received at the user device at the upcoming time by detecting a unique identifier corresponding to the portion of the first media content item in the third media content item.

16. The system of claim 11, wherein the control circuitry configured to determine that the portion of the first media content item is the portion of the third media content item that will be received at the user device at the upcoming time is further configured to:]
receive a first schedule comprising respective time periods for each of a first plurality of portions of the first media content item;
identify the time period of the respective time periods for each of the first plurality of portion of the first media content item corresponding to the portion of the first media content item;
receive a second schedule comprising respective time periods for each of a second plurality of portions of the third media content item; and
determine the time period corresponding to the portion of the first media content item is in the second plurality of portions of the third media content item.

17. The system of claim 11, wherein the control circuitry configured to store the portion of the first media content item is further configured to store, in local storage, a copy of the portion of the first media content item and a corresponding unique identifier.

18. The system of claim of claim 17, wherein the control circuitry is further configured to:
in response to storing the copy of the portion of the first media content item and the corresponding unique identifier, update a field in a storage-tracking data structure corresponding to the corresponding unique identifier.

19. The system of claim 18, wherein the control circuitry is further configured to:
determine whether the portion of the first media content item is stored based on the field corresponding to the corresponding to the unique identifier in the storage-tracking data structure.

20. The system of claim 19, wherein the control circuitry configured to determine the portion of the first media content item is stored is further configured to determine whether the corresponding unique identifier corresponds to a copy of the portion of the first media content item stored in the local storage.

* * * * *